Feb. 1, 1966  T. A. BYLES ETAL  3,233,109
AUTOMOBILE RADIO CONTROL CIRCUIT RESPONSIVE TO SPEED
Filed Jan. 14, 1963
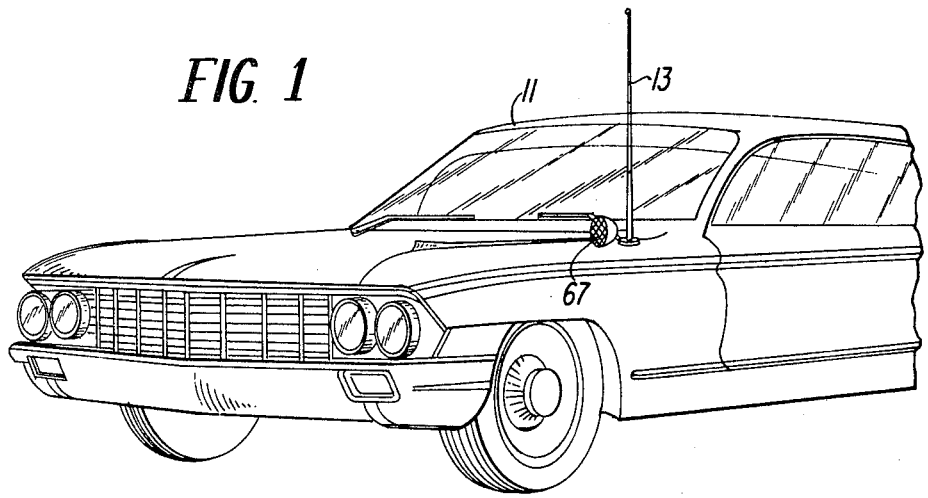
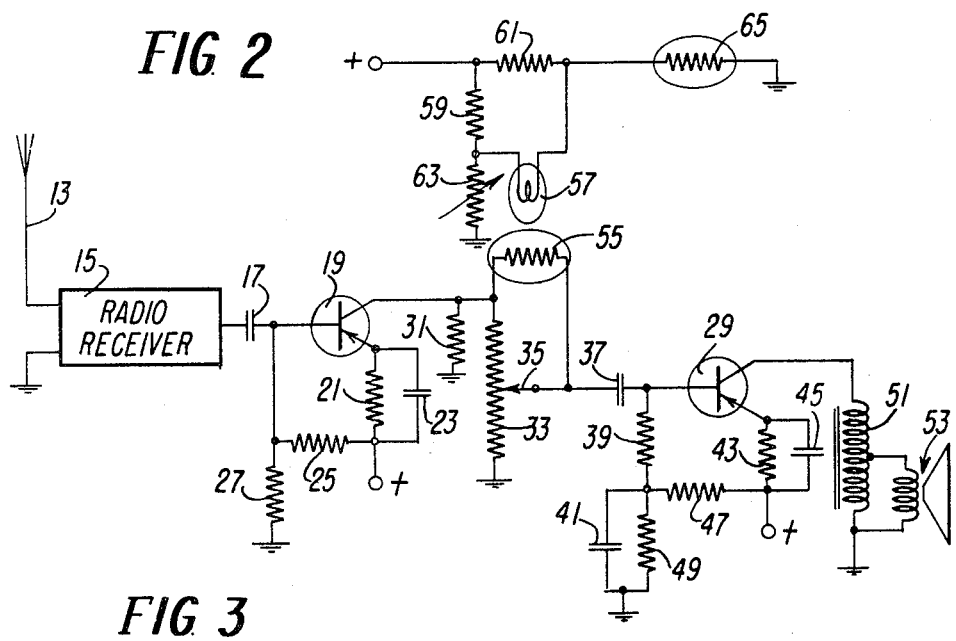
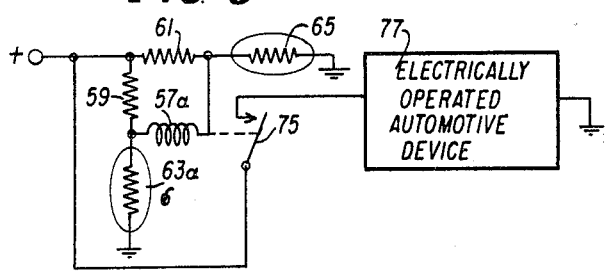
INVENTORS
Theodore A. Byles
BY Frederick P. Hill
Mueller & Aichele
ATTYS.

United States Patent Office 3,233,109
Patented Feb. 1, 1966

3,233,109
AUTOMOBILE RADIO CONTROL CIRCUIT
RESPONSIVE TO SPEED
Theodore A. Byles, Villa Park, and Frederick P. Hill,
Elgin, Ill., assignors to Motorola, Inc., Chicago, Ill., a
corporation of Illinois
Filed Jan. 14, 1963, Ser. No. 251,105
2 Claims. (Cl. 250—206)

This invention relates to control circuits responsive to the speed of an automobile, and more particularly to circuits which may be used to control the output of the audio amplifier stage of an automobile radio receiver in accordance with the speed of the automobile.

One of the major difficulties in automobile radio reception arises from the fact that as the speed of the automobiles increases, engine, road and wind noises increase as well. This means that in order to hear clearly over the increased noise, the volume of the receiver must be increased accordingly. Numerous ways have been proposed to increase this volume automatically according to the speed of the automobile. It may also be desirable under some circumstances, to control other electrically operated components of the automobile according to speed, for example, the heater, horn or lights. Control devices have been coupled to the ignition system of the automobile but these have often been objectionable in that they have disturbed the ignition system by tapping off the necessary control voltage for the system. Furthermore, many speed compensated control systems tend to be complex, expensive, and very difficult to add to a standard automobile.

Accordingly, an object of this invention is to provide a speed compensated control, for automobile accessories, which is simple and low in cost.

Another object of the invention is to provide an improved speed compensated volume control for use in an automobile radio receiver.

Still another object of the invention is to provide a speed compensated control for an automobile which control avoids the necessity of connection to the ignition system or other operating part of the automobile.

A feature of the invention is the provision of a control circuit having a thermistor connected to control an electrically operated component of an automobile and positioned in the air stream of the automobile to be cooled thereby.

Another feature of the invention is the provision, in an automobile radio receiver, of photoelectric means connected in the receiver to control the output thereof and an excitation circuit for the photo electric means which circuit is controlled by a self-heating thermistor mounted in the air stream of the automobile.

In the drawing:

FIG. 1 depicts the exterior of an automobile utilizing the invention;

FIG. 2 is a schematic diagram of a circuit constructed in accordance with the invention; and FIG. 3 is a schematic diagram of another circuit constructed in accordance with the invention.

In accordance with the invention, an automobile is provided with a circuit including a thermistor for controlling an electrically operated component thereof. Such circuit may include a photocell in a radio receiver connected to bypass the volume control of the amplifier, and a lamp for exciting the photocell to thereby vary its resistance. A self-heating thermistor may be connected to the energizing circuit for the lamp for varying the output of the audio amplifier. This thermistor is mounted on the exterior of the automobile to project into the air stream thereof. As the speed of the car varies, the resistance of the thermistor will vary according to the cooling effect of the air stream. This will vary the intensity of the light which in turn varies the resistance of the photocell to control the output of the audio amplifier according to the speed of the automobile. A relay may be used instead of the lamp in the circuit described, and the circuit may be used to control other electrically operated components of the automobile. Installation is simpel since there is no need to connect into the operating parts of the automobile.

Referring now to FIG. 1, there is depicted an automobile 11 having an antenna 13 mounted thereon for receiving radio freqeuncy signals. The receiver system provides sound to be heard by persons riding in the automobile. As the speed of the automobile increases, road, engine and wind noises increase accordingly, making it desirable to increase the audio output of the radio receiver mounted therein according to the speed of the automobile. This will insure that satisfactory levels of audibility will be maintained.

Referring now to FIG. 2, antenna 13 is shown coupled to radio receiver 15, which may include the usual amplifier and detector stages to provide an audio frequency output. The output of the receiver 15 is supplied through capacitor 17 to the base of transistor 19, which is the first stage of the audio amplifier. Current is supplied to the emitter of transistor 19 through resistor 21 and capacitor 23 connected in parallel. The base of transistor 19 is forward biased by means of resistors 25 and 27.

The collector electrode of transistor 19 is coupled through an RC network to the base of transistor 29. This RC network includes resistor 31 connected in parallel with variable resistor 33. Variable resistor 33 may serve as the volume control for the audio amplifier. The variable tap 35 of the volume control is coupled through capacitor 37 to the base of transistor 29. Resistor 39 and capacitor 41 complete the RC coupling network.

Current is supplied to the emitter of transistor 29 through resistor 43 and capacitor 45 connected in parallel. The base of transistor 29 is forward biased by means of resistors 47 and 49. The collector electrode of transistor 29 is connected through output transformer 51 to speaker 53.

A photocell 55 is connected across the tapped portion of variable resistor 33 to bypass the signal from transistor 19 to transistor 29. A lamp 57 is mounted proximate photocell 55 to excite the same and lower its resistance according to the intensity of lamp 57.

An energizing bridge circuit for lamp 57 supplies current thereto. Lamp 57 is connected across the bridge, which comprises resistors 59 and 61, variable resistor 63, and thermistor 65 which is a self-heating resistor having a negative temperature coefficient. As shown in FIG. 1, thermistor 65 may be mounted in an appropriate decorative fixture 67 so that thermistor 65 is exposed to the air stream of the automobile.

When initially installed, the energizing bridge circuit for lamp 57 may be balanced in still air by using variable resistor 63. During operation of the radio while the automobile 11 is stationary, the resistance of self-heating thermistor 65 will drop to a value low enough to render the potential across lamp 57 insufficient to light the lamp. As the speed of the automobile increases, thermistor 65 is cooled by the increased air flow and its resistance rises, increasing the voltage drop across the lamp 57. This will cause the lamp to glow at an intensity according to the speed of the automobile. Lamp 57 excites photocell 55, decreasing its resistance to cause more output signal from transistor 19 to bypass variable resistor 33. Thermistor 65 thereby controls the excitation current supplied to the photoelectric means including lamp 57 and photocell 55, and this varies the audio output of the amplifier as required. From the foregoing discussion, it will be apparent to those skilled in the art that the circuit of the invention could be modified to utilize a positive temperature coefficient resistor in place of thermistor 65.

The particular arrangement shown will tend to make rise in volume a function of the setting of the volume control or variable resistor 33. That is, for high settings of tap 35 most of the signal is already passing to transistor 29. Accordingly, there is less available output for transistor 19 for photocell 55 to bypass around the parallel portion of resistor 33 to transistor 29. This tends to prevent "blasting" at high initial setting of the volume control since the increase in volume due to increased speed will be less for high volume control settings.

In addition to controlling the audio output of a car radio, the invention may be put to use in controlling other electrically operated devices used in an automobile. For example, it might be desirable to include an electrically responsive clutch to decouple the engine fan at high speeds. Or the fan of a heater in the automobile might be turned off at high speeds when the increased intake of air makes it no longer necessary for proper heating. Other possible uses might be to increase the throw of the headlights or the volume or tone of the horn as the speed increases. FIG. 3 shows a circuit constructed in accordance with the invention used to control the energization of a particular electrically operated component. A relay 57a has been inserted in place of light 57 of FIG. 2, and is energizable to close a switch 75 in an energizing circuit for component 77. When the action of the thermistor 65 causes sufficient current to flow through relay 57a, switch 75 will close and component 77 will be energized. As above stated, component 77 might be a circuit controlling the heater, fan, etc. In addition, if ambient temperature compensation is needed, variable resistor 63 of FIG. 2, may be replaced by a second thermistor 63a mounted to be exposed to the same air temperature as thermistor 65 but protected from the air flow.

It may therefore be seen that the invention provides an improved speed compensated control for an automobile which is low in cost and simple of construction. The control is not connected to the operating mechanism of the automobile and does not disturb the ignition system or any other part of the automobile. It is therefore more eradily installed in a conventional automobile, since there is no connection to the various operating parts of the automobile.

We claim:

1. An automobile radio receiver having a speed compensated output, including in combination, an audio amplifier having first and second transistor stages, a first variable resistor coupling said first transistor stage with said second transistor stage to the output of said audio amplifier, a photocell connected in parallel with said first variable resistor to bypass the same, said photocell having a resistance which decreases as the light intensity increases, a lamp mounted proximate said photocell and having an intensity which varies with the excitation current supplied thereto, an energizing bridge circuit for said lamp including a self-heating thermistor for controlling the excitation current supplied to said lamp and a second variable resistor for setting the amount of excitation current required to excite said lamp, said thermistor having a resistance which increases as its temperature decreases and being mounted in the air stream of the automobile to be cooled thereby according to the speed of the automobile, said bridge circuit being constructed so that the voltage across said lamp and the current supplied thereto increases as the resistance of said thermistor increases, whereby the resistance of said thermistor will increase as speed increases causing greater intensity of light from said lamp to reduce the resistance of said photocell and bypass said first variable resistor, increasing the amount of signal supplied to said second transistor stage to increase the output of said audio amplifier.

2. In an automobile having an electrically operated device, a speed compensated control system for the device including in combination, a control amplifier having a variable resistor for controlling the output of said amplifier, a light responsive device connected in parallel with said variable resistor to bypass the same and increase the output of said amplifier, said light responsive device having a resistance which decreases as the light intensity increases, a lamp mounted proximate said light responsive device and having a light intensity which varies with the excitation current supplied thereto, an energizing circuit for said lamp including a self-heating thermistor having a resistance which increases as its temperature decreases for controlling the excitation current supplied to said lamp, said energizing circuit including means operating to increase the voltage across said lamp and the current supplied thereto as the resistance of said thermistor increases, said thermistor being mounted in the air stream of the automobile to be cooled thereby according to the speed of the automobile, whereby the resistance of said thermistor will increase as the speed increases causing greater intensity of light from said lamp to reduce the resistance of said light responsive device which bypasses said variable resistor and thereby increase the output of said control amplifier.

References Cited by the Examiner

UNITED STATES PATENTS

| | | | |
|---|---|---|---|
| 1,938,067 | 12/1933 | Davis | 250—205 X |
| 2,080,554 | 5/1937 | Wolff | 325—406 |
| 2,080,581 | 5/1937 | Smith | 325—406 |
| 2,849,622 | 8/1958 | Gridley | 250—205 |
| 2,959,958 | 11/1960 | Savet | 73—204 |
| 3,072,795 | 1/1963 | Badmaieff | 250—209 |
| 3,085,431 | 4/1963 | Yerman et al. | 73—204 |

FOREIGN PATENTS 1,116,268  11/1961  Germany.

OTHER REFERENCES

Goodyear: "Thermal Resistor Elements for Electrical Circuit Applications," Product Engineering, February 1945, pp. 93 to 95.

RALPH G. NILSON, *Primary Examiner.*

ARCHIE R. BORCHELT, *Examiner.*

E. STRICKLAND, J. D. WALL, *Assistant Examiners.*